Sept. 24, 1929.  R. S. BLAIR  1,729,025
WINDSHIELD CLEANING DEVICE
Filed May 29, 1924
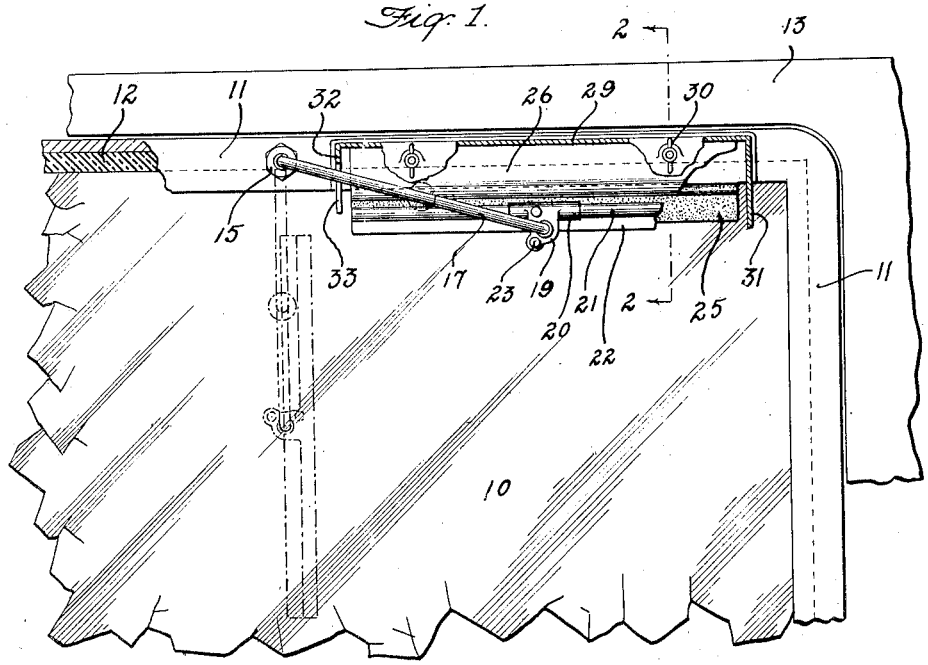
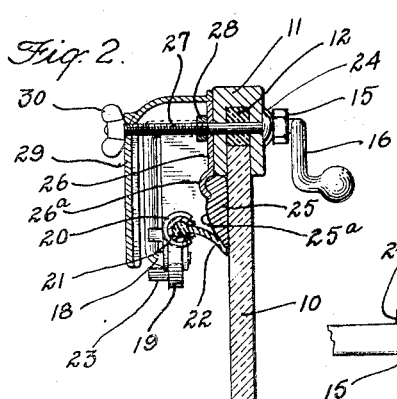
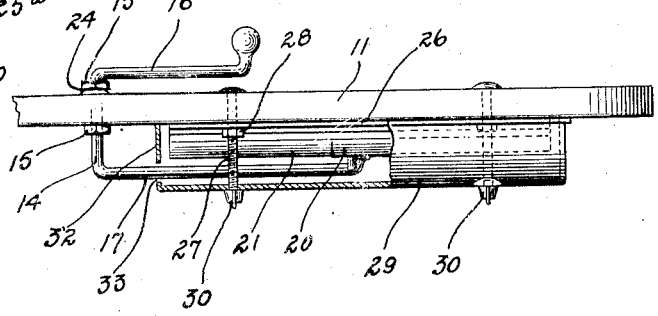
INVENTOR
Robert S. Blair Patented Sept. 24, 1929

1,729,025

UNITED STATES PATENT OFFICE

ROBERT S. BLAIR, OF STAMFORD, CONNECTICUT

WINDSHIELD-CLEANING DEVICE

Application filed May 29, 1924. Serial No. 716,616.

This invention relates to windshield cleaning devices for motor cars and the like.

One of the objects of the invention is to provide a device of the above nature adapted to dependably clean a windshield for clear vision therethrough in stormy weather. Another object is to provide a device of the above nature practical and efficient and capable of meeting the requirements of practical use in a highly satisfactory manner. Another object is to provide such a device which is simply made and inexpensive. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawing in which is shown one of the various possible embodiments of this invention, Figure 1 is a front elevation of the device in operative position, Figure 2 is a section taken substantially along the line 2—2 of Figure 1, and Figure 3 is a top plan view.

Similar reference characters refer to similar parts throughout the several views of the drawing.

Referring now to the drawing in detail there is shown a portion of a windshield of the usual construction comprising a glass 10 and a channel frame section 11 about the top and side edges thereof. Preferably there is inserted between the edge of the glass 10 and the frame 11 a strip of yielding material or packing 12 of rubber or felt or similar suitable material. The windshield, as will be understood, is ordinarily pivoted at its sides and adjacent its upper edge to the frame or other support on the motor vehicle which is indicated diagrammatically at 13 in Figure 1.

Extending through the frame 11 and the packing 12 and rotatable therein is a rod 14 held from axial movement as by a pair of nuts 15 and terminating on the inner side of the windshield in a handle 16 and on the outer side of the windshield in a part 17 extending substantially parallel to the handle 16. These parts are shown only diagrammatically since their specific construction is unimportant as relating to the features of this invention. The rod portion 17 extending substantially parallel to the surface of the windshield glass is bent inwardly at its end 18 and mounted loosely on this end is a lug 19. This lug 19 carries a clamp 20 in which is securely supported a channel 21. This channel 21 is elongated, as shown in Figure 1, being held by the clamp 20 substantially at its central portion, and carries a wiper 22 which is preferably of rubber or some similar material.

The wiper 22 rests against the surface of the windshield glass 10. By means of the handle 16 the channel member 21 and the wiper 22 carried thereby, may be swung in an arc about the rod 14 as a center, the wiper 22 rubbing along the surface of the glass during this movement. The pivotal connection between the rod portion 17 and the lug 19 permits the wiper 22 to move into a position parallel with the frame 11 and closely up against the same if desired at each end of its movement. A pair of stops 23, upon the lug 19, are adapted to engage the rod 17 to limit the extent of this swinging about the part 18. The wiper is at all times yieldingly urged against the surface of the glass by suitable means such as, for example, a spring washer 24 interposed between the windshield frame 11 and the inner nut 15 on the rod 14.

Mounted upon the windshield in the path of movement of the wiper 22 is an elongated member 25 of a length preferably substantially that of the wiper 22. This member 25 comprises a substance adapted to reduce the surface tension of water and is preferably a cake of glycerine soap containing an excess of glycerine. The soap 25 is supported closely against the glass 10 and preferably closely up against the windshield frame 11. A clamping member 26 provided with a lower hooked portion 26ª holds the cake of soap in position, the member 26 being secured by bolts 27 and nuts 28.

In operation the wiper 22 is moved across the surface of the glass by means of the handle 16 as above described. Near the end of its movement in a counter-clockwise direction, as viewed in Figure 1, the wiper comes into contact with the soap 25 and the latter is preferably provided with a sloping surface 25ª so that the wiper may ride up onto the same. The soap is soluble in water and in stormy weather the wiper 22 is moistened in traversing the wet surface of the windshield. As the moistened wiper 22 comes into contact and rides upon the surface of the soap 25, a small portion of the soap is dissolved forming a coating upon the wiping surface of the wiper 22. When the wiper is now swung across the surface of the glass in a clockwise direction and back again, this solution is left in a thin coating or film over the surface of the glass. This oily film of glycerine or glycerine soap serves to prevent the accumulation of rain drops upon the surface of the windshield thus maintaining the glass in condition for clear vision therethrough.

The soap cake 25 is so shaped and held in position that all except the small portion thereof beneath the part 26ª may be used. In order to replenish the supply, it is necessary to simply loosen the nuts 28 and insert a new cake of coap beneath the hooked part 26ª of the clamp 26. Preferably a shield 29 is employed to protect the cake of soap from rain. This shield 29 may be held in place, for example, by wing nuts 30 upon the bolts 27. The shield is preferably provided with side walls 31 and 32, the wall 32 being slotted as at 33, to permit free movement of the rod 17 carrying the wiper. It will be seen that the parts are compactly disposed close to the upper frame of the windshield and thus do not obstruct vision through the windshield.

From the above it will be seen that there is herein provided an apparatus which embodies the features of this invention and attains the objects thereof and that the same is well adapted to meet the requirements of practical use. It may be here noted that the term wiper as employed herein is to be interpreted in a broad sense to comprehend devices of any type adapted for moving along the surface of a windshield glass to clean the glass.

As many possible embodiments may be made of the above invention and as many changes might be made in the embodiment above set forth, it is to be understood that all matter hereinbefore set forth is to be interpreted as illustrative and not in a limiting sense.

I claim as my invention:

1. In a windshield cleaning device, in combination, a wiper, means for moving said wiper across the surface of the glass, and a surface-tension reducing substance positioned in the path of movement of said wiper adapted to be engaged thereby and transmitted thereby to the surface of said windshield.

2. In a windshield cleaning device, in combination, an elongated wiper, means for moving said wiper across the surface of the glass, and a surface-tension reducing substance positioned in the path of movement of said wiper and shaped and adapted to be engaged by said wiper throughout substantially the entire length thereof and transmitted thereby to the surface of said windshield.

3. In a windshield cleaning device, in combination, a wiper, means for moving said wiper across the surface of the glass, and solid means soluble in water and containing a surface-tension reducing substance positioned in the path of movement of said wiper and adapted to be engaged thereby and transmitted thereby to the surface of said windshield.

4. In a windshield cleaning device, in combination, actuating means adapted to swing a wiper over the surface of a windshield, a source of supply of a substance adapted to reduce the surface tension of water, and means comprising a wiper actuated by said actuating means positioned and adapted to coact with said source of supply at a predetermined point in the movement of the wiper and intermittently draw said substance from said source and apply it to the windshield.

5. In a windshield cleaning device, in combination, a wiper mounted adjacent said windshield, means for moving said wiper across the surface of the glass, and means mounted upon the windshield frame independently of said wiper adapted to supply a surface-tension reducing substance to the surface of said wiper.

6. In a windshield cleaning device, in combination, a wiper, means for moving said wiper across the surface of the glass, means soluble in water and containing a surface-tension reducing substance mounted in the path of movement of said wiper and adapted to be engaged by said wiper, and means for protecting said last means from rain.

7. In a windshield cleaning device, in combination, a wiper mounted adjacent said windshield, means adapted to move said wiper across the surface of the glass, and a member formed of a material adapted to reduce the surface tension of water mounted upon said windshield in position so that said wiper rides thereon during a part of its movement.

8. In a windshield cleaning device, in combination, a wiper mounted adjacent said windshield, means adapted to move said wiper across the surface of the glass, a soluble member of elongated form of a substance adapted to reduce the surface tension of water, and means removably securing said member upon the windshield in position to be engaged by said wiper.

9. In a windshield cleaning device, in combination, a wiper mounted adjacent said windshield, means adapted to move said wiper across the surface of the glass, a soluble member formed of a material adapted to reduce the surface tension of water mounted upon the windshield in position to be engaged by said wiper, and means forming a shield to protect said member from rain.

In testimony whereof, I have signed my name to this specification this 27th day of May, 1924.

ROBERT S. BLAIR.